United States Patent [19] [11] 3,961,123
Ohtomo [45] June 1, 1976

[54] RADIATION SHIELDING PHENOLIC FIBERS AND METHOD OF PRODUCING SAME

[75] Inventor: Koichiro Ohtomo, Takatsuki, Japan

[73] Assignee: Kanebo, Ltd., Tokyo, Japan

[22] Filed: Dec. 26, 1973

[21] Appl. No.: 428,127

[30] Foreign Application Priority Data
Dec. 29, 1972 Japan.................................. 48-2322

[52] U.S. Cl.................................. 428/224; 66/170; 139/426 R; 260/48; 260/49; 260/59 R; 260/60; 260/841; 260/842; 260/844; 428/364
[51] Int. Cl.$^2$.......................................... C08G 8/18
[58] Field of Search .................. 260/59, 48, 49, 60, 260/841, 842, 844; 428/224, 364

[56] References Cited
UNITED STATES PATENTS

| | | |
|---|---|---|
| 3,650,102 | 3/1972 | Economy et al.................... 260/838 |
| 3,651,199 | 3/1972 | Blume et al......................... 260/838 |
| 3,808,289 | 4/1974 | Okuhashi............................. 260/841 |

*Primary Examiner*—John C. Bleutge
*Attorney, Agent, or Firm*—Sherman & Shalloway

[57] ABSTRACT

A radiation shielding phenolic fiber comprising (A) a filamentary phenolic polymer consisting predominantly of a sulfonic acid group-containing cured novolak resin and (B) a metallic atom having a great radiation shielding capacity, the metallic atom being incorporated in the polymer by being chemically bound in the ionic state in the novolak resin; a fibrous material, such as fibers, yarns, knit fabrics, woven fabrics, nonwoven fabrics, felt, mat, composed of the aforesaid radiation shielding phenolic fiber; and a method for the production thereof.

11 Claims, 1 Drawing Figure

U.S. Patent June 1, 1976 3,961,123
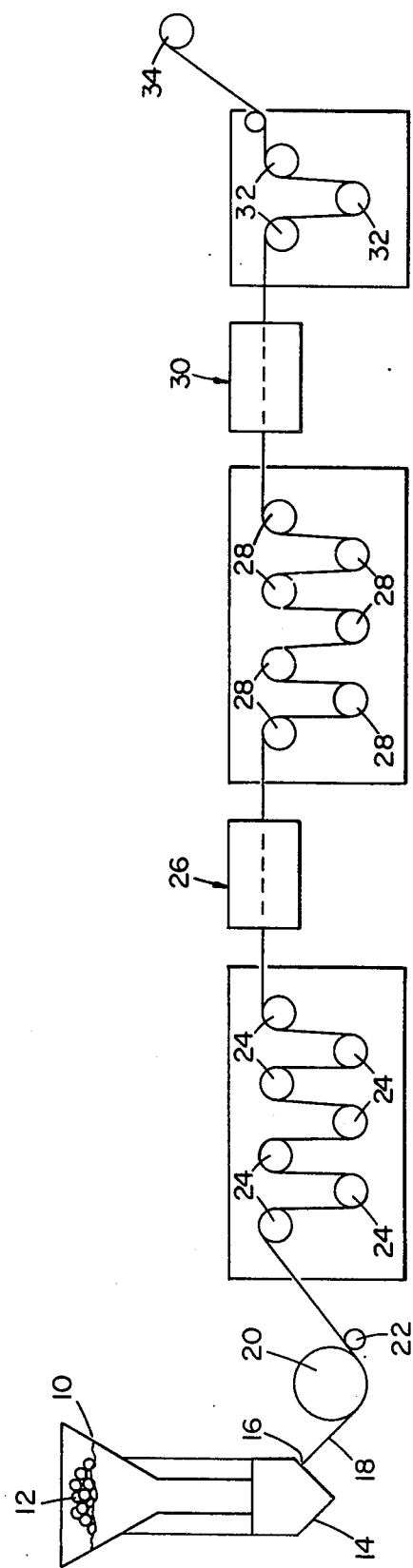

RADIATION SHIELDING PHENOLIC FIBERS AND METHOD OF PRODUCING SAME

This invention relates to fibers possessing the capacity of shielding radiation. More particularly, the invention relates to radiation shielding phenolic resin fibers incorporated in a chemically bound state with a metallic atom having a great radiation shielding capacity, as well as to a method of producing such fibers.

In recent years there has been a rapid increase in the handling of radioactive substances in various industrial areas, e.g., the chemical field, as well as the medical field not to mention the nuclear reactors. As a consequence, personnel working in these fields must wear radiation shielding clothing in performing their work. As a radiation shielding garment of this kind, there has been used hitherto garments made of a textile material such as a knit or woven fabric coated with a radiation shielding material of powdered lead that has been applied along with a resin binder. However, the textile materials applied with a coating in this manner are not only very heavy but also are completely devoid of air permeability. Hence, it is not only uncomfortable to wear but unhealthy as well. In addition, the radiation shielding effect is not fully adequate as yet. Furthermore, when a textile material is to be used as a radiation shielding material, there are imposed considerble restrictions as to the choice of the material, since there are some textile materials in which degradation takes place in the properties of the material as a result of exposure to radiation.

Accordingly, there has been a desire all along for the development of a radiation shielding textile material which excels in the capacity of shielding radiation and in which the degradation of the properties of the material resulting from exposure to radiation is exceedingly small.

It is therefore an object of the present invention to provide new radiation shielding fibers which not only excel in the capacity of shielding radiation but also are very stable to irradiation by radiant energy, with the consequence that there is no degradation of the properties of the fibers.

Another object of this invention is to provide a method whereby such radiation shielding fibers can be produced commercially readily at low cost.

According to this invention, there is provided radiation shielding phenolic fibers comprising a filamentary phenolic polymer consisting predominantly of a sulfonic acid group-containing cured novolak resin and a metallic atom having a great radiation shielding capacity incorporated in the polymer by being chemically bound in the form of ions in the novolak resin.

I found that the phenolic resin fiber made up predominantly of the phenol nucleus had a highly cross-linked three-dimensionalized chemical structure and thus being extremely stable to irradiation by radiant energy was extremely suitable for use as the substrate fiber of radiation shielding fibers. Thus, the invention radiation shielding phenolic fiber is one which has achieved the foregoing object of the invention by using as its substrate such a phenolic resin fiber and dispersing therein by chemically bonding through the intermediary of the sulfonic group a metal whose capacity for shielding radiation is great. Hence, the invention radiation shielding phenolic fiber differs essentially from those of the prior art wherein the surface of a textile material is coated with a powder of a radiation shielding metal or an oxide thereof along with a resinous binder.

The production of the novel radiation shielding phenolic fibers of this invention is not only simple but economical as well, and large scale commercial production is also possible. For instance, these fibers can be produced by the following steps:

a. curing an uncured novolak resin consisting predominantly of a filamentary phenolic polymer, using a curing agent;

b. sulfonating the cured filamentary phenolic polymer; and c. submitting that so obtained cured filamentary phenolic polymer having a sulfonic acid group to a treatment, if necessary, to convert the sulfonic acid group to the form of an alkali metal salt, and thereafter treating the polymer with a solution containing metallic ions having a great radiation shielding capacity to incorporate in the filamentary phenolic polymer a metallic atom possessing a great capacity for shielding radiation.

The present invention will be more fully described below.

FILAMENTARY PHENOLIC POLYMER polymer

The filamentary phenolic polymer used in the present invention as the substrate of the radiation shielding phenolic fiber consists predominantly of a fiber-forming novolak resin. Such a novolak resin is uncured and fusible in the starting molten resin mixture and can be cured with a curing agent after melt-spinning or jet spinning (the spinning process whereby a fine stream of the molten mixture is allowed to fall onto a path of a high speed gas stream such as a non-oxidizing gas, for example nitrogen gas, thereby to fiberize the stream of the molten mixture).

The method of preparing the novolak resin is well known. It can be produced by reacting a phenol with an aldehyde under heat in the presence of an acid or basic catalyst. Usually, novolak resins have a number average molecular weight of about 300 to about 2,000. If desired, those having a larger molecular weight (for example, up to about 5,000) can be prepared. As is well known, therefore, the predominantly novolak-type modified novolak esins obtained by any desired combination of the novolak-type reaction and the resol-type reaction can also be used. Furthermore, any desired combination of phenols and aldehydes can be used, and different novolak resins each derived from a different combination of phenol and aldehyde can be used together.

The phenols used for producing the phenolic resins are most commonly phenol and cresol. But other phenols can also be used. Examples of the phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol, and mixtures of two or more of these with each other.

Furthermore, phenols containing at least one halogen atom, preferably up to 3 halogen atoms, on the benzene nucleus can be used. Examples of such halogenated phenols are o-chlorophenol, m-chlorophenol, p-chlorophenol, o-bromophenol, m-bromophenol, p-bromophenol, 3,5-dichlorophenol, 3,5-dibormophenol, 3-chloro-5-bromophenol, 2,3-dichlorophenol, 3,4- dichlorophenol, 2,3-dibromophenol, 3,4,5-trichlorophenol, 3,4,6-tribromophenol, and 2,3,6-tribromophenol. The o-chlorophenol, m-chlorophenol and p-chlorophenol are especially preferred. Preferably, these halogenated phenols are used in combination with other phenols described above rather than alone. The halogenated phenols can be present in the mixture in an amount of at least 3% by weight, preferably 10 to 80% by weight, and more preferably 20 to 60% by weight, based on the total weight of the phenols. When the phenols containing these halogenated phenols are used, phenolic fibers having more improved heat resistance can be used.

The aldehyde most commonly used for polycondensation with the above phenol is formaldehyde, but other aldehydes such as para-formaldehyde, hexamethylene tetramine and furfural can also be used.

Various catalysts, acid or basic, can be used for phenolic resin-forming reactions. Examples of the acid catalyst include any known organic or inorganic acids, such as hydrochloric acid, nitric acid, sulfuric acid, phosphoric acid, zinc chloride, aluminum chloride, formic acid, acetic acid, oxalic acid, p-toluenesulfonic acid, or phthalic acid. The basic catalyst may, for example, be ammonia, sodium hydroxide, potassium hydroxide or hexamethylene tetramine.

The uncured novolak resins obtained by addition or condensation of the phenols and aldehydes can be used as such for fiber preparaton. It is also possible in the present invention to use blends of such novolak resins as a main component with other fiber-forming thermoplastic synthetic resins. In the blend, the amount of the other fiber-forming thermoplastic synthetic resin may be not more than 30% by weight but not less than 0.1% by weight based on the total weight of the blend. The amount of the fiber-forming thermoplastic synthetic resin is preferably 25 to 2% by weight, especially 20 to 5% by weight, and most preferably 15 to 10% by weight, based on the total weight of the blend.

The fiber-forming thermoplastic synthetic resin which constitutes the other element of the filament of this invention is preferably selected from the group consisting of polyamide resins, polyester resins, polyolefin resins and polyurethane resins. Other fiber-forming thermoplastic synthetic resins can also be utilized in this invention.

The term "fiber-forming thermoplastic synthetic resin," as used herein and the appended claims, is meant to include not only the individual resins mentioned above, but also blends of the different resins, copolymerized resins, of these with minor amounts of other copolymerizable comonomers, or blends of the same resins of different monomer combinations or molecular weights.

Of these fiber-forming thermoplastic synthetic resins, the polyamide resins are especially preferred in view of their good dispersibility in the novolak resin, effects of improving the spinnability of the novolak resin, or little likelihood of exerting adverse effects on the flame-resistant and antifusing properties of the novolak resin, etc.

Specific examples of the fiber-forming thermoplastic synthetic resin include polyamide resins such as nylon 6, nylon 11, nylon 12, nylon 66, nylon 610, nylon 611, nylon 612, and blends of two or more of these with each other; polyester resins such as polyethylene terephthalte, polyesters derived from the same constituent elements as polyethylene terephthalate with a part of the ethylene glycol replaced by other known glycols, polyesters derived from the same constituent elements as polyethylene terephthalate with the terephthalic acid replaced by ortho- or meta-phthalic acids, other known aliphatic dicarboxylic acids or blends of two or more of these with each other; polyester ethers such as polyethylene hydroxybenzoate; elastomeric polymers such as polyurethane, and polyolefin resins such as polyethylene, polypropylene, and ethylenepropylene copolymer, or blends of two or more of these with each other.

Accordingly, it should be understood that the term "phenolic polymer," used herein and the appended claims, is meant to include not only the novolak resin alone but also the blends of the novolak resin and up to 30% by weight, based on the total amount of the blend, of the other fiber-forming thermoplastic synthetic resins described above.

The phenolic polymer can be fiberized by melt-spinning or jet spinning.

The spinning apparatus and operation are well known and thus will not be described in this specification. The molten mixture to be subjected to melt-spinning may contain hexamethylenetetramine in an amount capable of inducing a partial curing of the mixture but being not detrimental to the melt-spinning of the molten mixture containing an uncured novolak resin, for example, in an amount of less than 5% by weight based on the uncured novolak resin. The incorporation of hexamethylenetetramine, however, is not altogether necessary, and it is sufficient that the melt-spun filament is cured using the curing agent described above.

The known treatments, such as filtration or defoaming, of the molten mixture can be performed at any time before the molten mixture reaches the spinneret. The spun filament can be cured after wind-up or at any time before wind-up. The wind-up rate is usually about 200 to 2500 meters per minute. Usually, wind-up rates somewhat faster than the spinning speed give favorable effects to the tenacity of the resulting filament.

Known oils, or n-paraffinic hydrocarbons, etc. can be utilized as spinning oil preparations.

The curing of the melt-spun filament can be performed in various ways. The melt-spun uncured phenolic filaments can be cured at room temperature to an elevated temperature of up to about 150°C. by a method known per se.

The curing method can be chosen according to the type and amount of the phenolic resin, the type and amount of the thermoplastic synthetic resin, the denier of the filament, the type and amount of the curing agent, and the like.

Formaldehyde is most commonly used as a curing agent. Other curing agents can also be used, the examples being aldehydes such as paraformaldehyde, hexamethylene tetramine, furfural, chloral, or glyoxal, and compounds which generate formaldehyde for example, on heating, such as trioxane, tetraoxane or polyoxymethylene.

Generally, the melt-spun filaments are immersed, or caused to run through, a bath containing the curing agent and the basic or acid catalyst described above and held at room temperature or temperatures near room temperature, for example, 5° to 45°C., preferably 10° to 40°C., and heat-cured at a temperature, for example, 60° to 140°C., preferably 70° to 110°C. The contact between the filaments and a liquid containing the curing agent is not limited to the method described, but other means such as spraying or fuming can also be utilized.

One example of the liquid containing the curing agent is 5 – 45%, preferably 15 – 30%, aqueous solution of formaldehyde of which pH has been adjusted to 8 – 13, preferably 5 – 11 by addition of the basic catalyst.

Another example of the liquid containing the curing agent is a 0.5 – 40% preferably 1 – 35%, aqueous solution of formaldehyde and 0.1 – 35%, preferably 1 – 20%, of the acid catalyst as mentioned above.

In another mode of cure, the filaments are cured by heating in a mixed bath of hexamethylene tetramine and an n-paraffinic hydrocarbon at 50° to 150°C. According to still another mode, the filaments are treated in a fume or vapor containing formaldehyde and the basic or acid catalyst.

Preferably, after contacting the melt-spun filaments with the curing agent, the temperature is raised gradually to the heat-curing temperature. For example, the temperature is raised to the desired point at a rate of about 3° to 20°C./hour from the initiation of heat-curing. Or the temperature is maintained as low as possible at the initial state of heat-curing, and substantial raising of the temperature is performed from the intermediate stage of heat-curing until the final desired temperature is obtained or substantial temperature raising is performed from the initial stage of heat-curing, but the final temperature is held at as low a point as possible and this state is maintained. After the curing operation, the filaments are washed with water, and dried to obtain the final filament product.

The heat-curing time is optionally chosen according to the way in which the curing operation is performed, the heating temperature, the type and concentration of the curing agent and catalyst, the type and amount of the novolak resin, the type and amount of the thermoplastic synthetic resin, the denier of the filaments, etc. Usually, it is about 1 to 20 hours. If desired, the heat-curing time can be either shorter or longer.

Specifically, for example, the uncured phenolic filaments are dipped at room temperature for 0 to 5 hours in a mixed aqueous solution containing 0.1 to 30% by weight of an acid catalyst, for example, a mineral acid such as hydrochloric acid, sulfuric acid or Lewis acid, an organic carboxylic acid such as acetic acid or formic acid, or a sulfonic acid such as p-phenolsulfonic acid or p-toluenesulfonic acid and 0.5 to 35% by weight of an aldehyde such as formaldehyde with a filament-to-solution ratio of 1:5 to 1:200, and the solution is heated from room temperature to 50° to 150°C. in the course of 0.05 to 10 hours. The solution is then maintained at a temperature of 50° to 105°C. for 2 to 20 hours to cure the filaments. In an alternative mode, the solution after being heated as mentioned above is maintained at a temperature of 50° to 105°C. for 0 to 2 hours to cure the filaments partially, preferably to a curing degree of 0.5 – 3%, especially 1 – 2%, and then the filaments are immersed at room temperature in a mixed aqueous solution containing 0.2 to 15% by weight of a basic catalyst such as ammonia or sodium hydroxide or potassium hydroxide and 1 to 35% by weight of formaldehyde. Then, the solution is heated to 70° – 95°C. over a period of about 1 hour, and maintained at this temperature for 0.5 to 10 hours thereby to cure the filaments. In still another mode, the reaction at 50° – 105°C. after being heated in the above-mentioned curing reaction is carried out for 2 hours at the longest to cure the filaments partially to the curing degree mentioned above, and then the filaments are dipped at room temperature in a mixture, or a mixed aqueous solution, containing 0.2 – 15% by weight of the above basic catalyst or 0.1 – 30% by weight of the above acid catalyst, 1 – 35% by weight of formaldehyde and 0.1 – 80% by weight of a solvent. The solution is then heated to 40° – 110°C. in the course of 0.2 to 2 hours and maintained at this temperature for 0.2 to 10 hours to cure the filaments.

The solvent that can be used for this purpose may, for example, be alcohols such as methanol, ethanol or isopropanol, ketones such as acetone or methyl ethyl ketone, ethers such as dioxane or tetrahydrofuran, polar solvents such as dimethylformamide, dimethylacetamide or dimethyl sulfoxide, or aromatic hydrocarbons such as benzene, toluene or xylene.

The term "curing degree" of the cured filaments, as used herein and the appended claims, is the percentage of the increase in weight of the cured filaments based on the original weight of the uncured filaments.

The filamentary phenolic polymer used as the substrate of the radiation shielding phenolic fiber of this invention can be cured to an extent that its curing degree after the curing treatment is 5 – 30%, preferably 9 – 25%, and more preferably 11 – 20%. A phenolic filament whose curing degree is less than 5% is undesirable, since the degradation of its yarn properties during the sulfonation treatment to be hereinafter described is great because the infusibility of the filament is inadequate. On the other hand, when the curing degree exceeds 30%, the cross-linking density becomes too great, with the consequence that only an undesirable filament whose flexural property and elongation are poor can be obtained.

Further, when carrying out the previously described spinning or curing treatment, an active nitrogen-containing compound of the formula

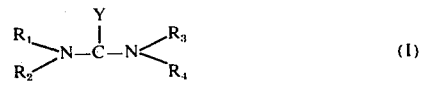  (I)

wherein Y is an oxygen atom, sulfur atom or NH group, and $R_1$, $R_2$, $R_3$ and $R_4$, which may be the same or different, each represent a hydrogen atom, lower hydroxyalkyl group such as hydroxymethyl, hydroxyethyl or hydroxypropyl, or lower alkoxyalkyl group, preferably methoxymethyl, methoxyethyl and ethoxymethyl, or $R_1$ and $R_3$ together may form a lower alkylene group such as —$CH_2CH_2$- or —$CH_2CH_2CH_2$-; as exemplified by such, for example, as urea, thiourea, a mono- or dimethylol derivative of urea or thiourea, or a mono- or dimethyl or ethyl ether of urea or thiourea, melamine, acrylamide, acrylthioamide, N-methylolated acrylamide, N-methylolated acrylthiomide, N-methylol acrylamide methyl ether, dicyandiamide, triethylene tetramine, polyethylene imine or piperazine can be introduced into the phenolic polymer to obtain a phenolic fiber in which these compounds are attached. A phenolic filament incorporated with a compound such as these shows an improvement of as much as 50° – 70°C. in its heat resistance. Hence, such a filament is useful as a starting material of a radiation shielding fiber where heat resistance is especially required.

The incorporation in the phenolic polymer of the compounds of formula (I) can be accomplished by mixing the compound of formula (I) in the molten polymer prior to spinning of the polymer or by treating the filaments with a liquid containing the active nitrogen-containing compound at any desired stage during the curing of the melt-spun uncured filaments.

This latter method can be performed by replacing at least a part of the curing treatment of phenolic filaments by a step of contacting the filaments with a liquid containing the active nitrogen-containing compound at a temperature from room temperature to 150°C. This liquid can contain an aldehyde and/or a basic or acid catalyst in the concentration to be described. Most generally, the contact can be performed by immersing the filaments in a liquid bath containing the nitrogen-containing compound, or by causing the filaments to run through the bath, or by spraying or fuming.

In this mode of the invention, the uncured filaments can be treated with a liquid containing the nitrogen-containing compound after curing them partially by a curing method known per se. Or conversely, the filaments can first be treated with the above liquid and then be cured by a customary method. Or, the entire process of curing can be replaced by the treatment with the liquid containing the active nitrogen-containing compound. Furthermore, the curing treatment and the treatment with the above-described liquid can be carried out simultaneously. However, in either of the above methods of treatment, it is essential to treat the uncured filaments with a treating solution containing an aldehyde or a compound containing a group derived from an aldehyde, such as a methylol group, and preferably those active nitrogen-containing compounds described above which contain hydroxyalkyl. This is for the purpose of ensuring a reaction between the phenolic polymer and the active nitrogen-containing compound.

Furthermore, in order to avoid undesirable dissolution of the uncured filaments in the early stage of their cure, it is desirable to treat the filaments with an aqueous treating liquor or an organic solvent-water treating liquor. In applying this method, it is recommended that the uncured phenolic filaments be first treated with an aqueous treating liquor or an organic solvent-water treating liquor to cure the filaments partially, and then, the partially cured filaments be further cured under stronger conditions while being swollen thereby to form cured filaments which are cured even at their inner parts.

This method will now be further illustrated by means of few specific modes of operation.

i. The phenolic filament, after having been partially cured (curing degree of 0.1 – 3%), as hereinbefore described, is immersed at room temperature in a combined solution consisting of 0.1 – 25% by weight of an acid or basic catalyst, 1 – 30% by weight of a formaldehyde, 0.5 – 15% by weight of either urea or a thiourea, and 1 – 50% by weight of an alcohol such as methanol or ethanol, or a ketone such as acetone or methyl ethyl ketone, or an ether such as dioxane or tetrahydrofuran; after which the temperature of the solution is raised up to 50° – 90°C. during a period of 0.5 – 2 hours, at which temperature the reaction is carried out for a further 0.5 – 25 hours; or ii. The uncured filaments are first dipped at 0° to 40°C. for 0 to 12 hours in an aqueous solution or organic solvent-water solution of a mixture of an aldehyde and the active nitrogen-containing compound or the active nitrogen-containing compound containing a lower hydroxyalkyl group, and the solution is heated in the presence of an acidic catalyst at a temperature from room temperature to 50° – 105°C. in the course of 0.05 to 10 hours. The solution is maintained at this temperature for 0 to 2 hours to cure the filaments to a curing degree of 0.1 – 3%, preferably 0.5 – 2.5%. The partially cured filaments are immersed in an organic solvent solution of a lower hydroxyalkyl-containing active nitrogen-containing compound, which may be the same as or different from the above nitrogen-containing compound or in an aqueous or water-organic solvent solution of an aldehyde and allowed to stand for 0 to 2 hours in the presence of a basic or acid catalyst. Then the solution is heated gradually from room temperature to 50° – 150°C. in the course of 0 to 3 hours and maintained at this temperature for 0 to 15 hours. Thus, it becomes possible to make phenolic filaments which possess such bonds as those of urea and not only are heat-infusible and solvent-insoluble but also excel in nonflammability and heat resistance.

Again, the introduction of the compounds of formula (I) can also be carried out by either immersing the phenolic filaments cured as hereinbefore described in a liquid containing the compounds of formula (I) or spraying the filaments with such a liquid.

For instance, the cured phenolic filaments are dipped in a solution containing the above-described active nitrogen-containing compound and treated generally at 45° to 150°C., and preferably 60° to 105°C., for 0.5 to 10 hours. Then the treated filaments are washed and dried thereby introducing the active nitrogen-containing compound into the inside of the filaments.

The melt-spun filament can be drawn at any desired time before and/or after curing. The drawing often results in imparting desirable properties to the filaments.

The drawing operation may be conducted either in a single stage or in two or more stages, and the filaments can be either cold or hot drawn. In the case of a multi-stage drawing, cold and hot drawing can be optionally combined. The draw ratio is also optional, it being usually up to 2.5X based on the length of the undrawn filament.

The phenolic filaments obtained in this manner are then fed to the following sulfonation step in the form of such as filaments, staples, knit or woven fabrics, or nonwoven fabric.

SULFONATION

The sulfonation can be carried out by various methods, there being no particular restrictions as to the methods employable so long as the sulfonic acid group ($-SO_3H$) is introduced either directly to the phenol nucleus of the novolak resin making up the invention phenolic fiber or to the methylol group or phenolic hydroxyl group that are bound to the phenol nucleus.

For instance, the sulfonic acid group can be introduced into the phenolic polymer by treating the cured phenolic filaments with a sulfonating agent such as concentrated sulfuric acid, oleum, chlorosulfonic acids, sulfur trioxide or sulfuryl chloride. The conditions of the sulfonation can be varied over a broad range depending upon such factors as the composition and curing degree of the phenolic polymer, the denier of the filament and the class of the sulfonating agent employed. Usually, the sulfonation can be accomplished by immersing the phenolic filaments to be sulfonated in a bath containing a sulfonating agent such as indicated above at a temperature of 0° – 150°C, and preferably 10° – 120°C. at a bath ratio (i.e., a weight ratio of the filament to the sulfonating agent) of 1:10 – 1:100, and preferably 1:20 – 1:50 followed by holding the filaments in the bath for 1 – 10 hours, and preferably 3 – 5 hours. However, in the case where the chlorosulfonic acids are used as the sulfonating agent, it is necessary after the sulfonation to convert the chlorosulfonyl group to the sulfonic acid group by hydrolysis.

For accelerating the sulfonation in this case, the cured phenolic filaments can, if required, be submitted prior to the sulfonation to a swelling treatment with a swelling agent such as dioxane, acetone, methyl ethyl ketone, benzene, toluene, xylene, dimethylformamide or dimethylacetamide. This swelling treatment can usually be carried out by dipping the cured phenolic filaments in a bath containing such a swelling agent for about 1 – 5 hours at a temperature of 50° – 120°C. Now, taking the case where the sulfonation of the cured phenolic filaments is to be carried out by using, say, concentrated sulfuric acid, this can be accomplished in the following manner. The phenolic filaments are treated by immersion at the rate of 1 – 10 parts by weight in a bath containing 100 parts by weight of concentrated sulfuric acid, the treatment being carried out for 5 – 10 hours at a temperature of 80° – 150°C. to introduce the sulfonic acid groups into the phenol nucleus of the novolak resin of the phenolic filaments. On the other hand, when the sulfonation is to be carried out with oleum, the sulfonation is likewise possible by a treatment consisting of immersing the phenolic filaments for 1 – 10 hours, using a temperature of 0° – 80°C. instead of the aforesaid temperature.

In sulfonating the cured phenolic filaments using the aforementioned sulfonating agents, say, concentrated sulfuric acid, there are cases where discoloration of the filaments takes place depending upon the sulfonating conditions employed. Hence, when it is desired to avoid such a discoloration, the sulfonating method which uses aminosulfonic acids is suitably used.

As the aminosulfonic acids, conveniently usable are such, for example, as taurine, N-alkylated taurine such as N-methyltaurine, or the alkali metal salt of these compounds such, for example, as sodium salt of taurine, sodium salt of N-methyltaurine and potassium salt of N-methyltaurine.

In the case of the cured phenolic polymer of a curing degree up to 30% that is used in the present invention, the methylol group (—CH$_2$CH) is usually present at the rate of 3 - 20 mol% for each phenol nucleus. In the sulfonating method which uses the aminosulfonic acids, this methylol group reacts with the aminosulfonic acids, and generally 0.5 – 1.5 meq/g-filament of the sulfonic acid groups are introduced.

The sulfonation reaction which uses an aminosulfonic acid is generally carried out by immersing the cured phenolic filaments in a bath containing the aminosulfonic acid at a concentration of preferably 5 – 80% by weight, and more suitably 10 – 60% by weight, in either water or an organic solvent such, for example, as methanol, ethanol, propanol, dioxane, dimethylformamide, dimethylacetamide or dimethylsulfoxide, or a solvent mixture of two or more of the foregoing solvents, at a temperature of 70° – 150°C., and preferably 80° – 130°C., at a both ratio of 1:10 – 1:100, and preferably 1:20 – 1:70, where the filaments are held for 1 – 5 hours, and preferably 2 – 4 hours, to accomplish the sulfonation. When using an organic amino it is an advantage to choose as the phenolic filaments those which are swellable. Thus, it becomes possible as a result of the reaction between the amino groups and the methylol groups to introduce the sulfonic acid groups without causing discoloration of the fibers or impairing in the least the yarn properties. However, in this method of sulfonation, there is in general the disadvantage that the amount of sulfonic groups introduced becomes somewhat less.

The sulfonation treatment which uses the amino-sulfonic acids will be more specifically understood from the following description in which the instance of the use of N-methyltaurine is illustrated. The cured phenolic filaments in an amount of 1 – 10 parts by weight is added to 100 parts by weight of a 70% aqueous N-methyltaurine solution and treated by holding the filaments immersed in the solution for 1 – 5 hours at a temperature of 70° – 120°C., whereby it becomes possible to introduce the sulfonic acid group into the phenolic filaments in an amount of usually 0.5 – 2.0 meg/g-filament. Alternately, the cured phenolic filaments are treated by immersion in a 30 weight % dimethylformamide solution of taurine at a bath ratio of 1:100 for 3 – 5 hours at a temperature of 90° – 150°C., whereby it also becomes possible to introduce in like manner the sulfonic acid groups in an amount usually of 0.8 – 1.6 meq/g-filament.

It is also possible in the case of this sulfonation to submit the phenolic filaments to a swelling treatment with a swelling agent in advance of the sulfonation treatment.

A still another effective method of introducing the sulfonic acid group is that of introducing the sulfonic acid group to the phenolic hydroxyl group of the phenolic polymer, say, but the etherization reaction, using an oxysulfonic acid such as isethionic acid. Usable in like manner as the oxysulfonic acids other than isethionic acid are such as 3-hydroxy-1-propanesulfonic acid, 4-hydroxy-1-butanesulfonic acid or the dehydrocyclized products thereof.

This sulfonation reaction which uses these oxysulfonic acids can be usually carried out in the following manner. The cured phenolic filaments to be sulfonated are immersed in a sulfonating solution of the oxysulfonic acid in either water or an organic solvent, preferably one or more classes of a phenolic filament-swellable organic solvent such as dioxane, dimethylformamide, dimethylacetamide or dimethyl sulfoxide at a concentration of 20 – 80% by weight, and preferably 30 – 60% by weight, for 1 – 10 hours, and preferably 2 – 8 hours, at a temperature of 80° – 150°C., and preferably 100° – 130°C. In this case, for accelerating the sulfonation reaction, a catalytic amount of an acid such, for example, as p-toluenesulfonic acid, benzenesulfonic acid, zinc chloride, sulfuric acid or phosphoric acid can be added to the bath in an amount of 0.5 – 5 percent by weight. More specifically, the introduction of the sulfonic acid groups can be accomplished, for example, by adding 1 – 10 parts by weight of the phenolic filaments to 100 parts by weight of a solution obtained by adding 3% by weight of p-toluenesulfonic acid to a 30 weight % dimethylacetamide solution of isethionic acid and treating the filaments by immersion therein for 1 – 5 hours at a temperature of 100° – 145°C. Thus, phenolic filaments are obtained in which are introduced the sulfonic acid groups in an amount of 1 – 2.5 meq/g-filament.

Regardless of which of the foregoing methods are used in introducing the sulfonic acid group, it is desired that the sulfonated filamentary phenolic polymer consisting predominantly of a novolak resin contains the sulfonic acid group in an amount of 0.1 – 4.0 meq/g-filament, preferably 0.5 – 3.0 meq/g-filament, and more preferably 1.0 – 2.0 meq/g-filament. When the amount of sulfonic acid groups introduced is less than 0.1 meq/g, this is undesirable, since the amount of radiation shielding metallic ions bound is small. On the other hand, when 4.0 meq/g is exceeded, there is a tendency to a greater degradation of the yarn properties of the phenolic fiber.

INTRODUCTION OF THE METALLIC ATOM OF GREAT RADIATION SHIELDING CAPACITY

The most characteristic feature of the radiation shielding phenolic fiber of this invention resides in the point that a metallic element having a capacity for shielding radiation is introduced into the fiber by being chemically bound in the ionic state in the novolak resin contained in the cured filamentary phenolic polymer that has been obtained as hereinbefore described.

As the metallic elements having a great radiation shielding capacity, those which can exist as cations in an aqueous solution and can intercept the transmission of radiation are used and, in general, the metallic elements whose atomic number is large, and especially those having an atomic number of above 13 such, for example, as aluminum, chromium, manganese, iron, cobalt, nickel, copper, zinc, silver, palladium, zirconium, antimony, titanium, cadmium, barium and lead can be used. Of these, cadmium, barium and lead are especially preferred. And of these three elements, lead is to be most preferred.

These metals can be readily introduced into the cured filamentary phenolic polymer having a sulfonic acid group, which has been formed as hereinbefore described, by treating the polymer with a solution containing the aforementioned metallic ions.

Further, for facilitating the ion exchange, the sulfonic acid group introduced into the phenolic polymer, as hereinbefore described, can, if necessary, be converted in advance to the form of an alkali metal salt by treatment with an aqueous solution of an alkali metal compound such as potassium hydroxide.

The solution containing the metallic ions having a great radiation shielding capacity include the solutions of the water-soluble salts such as the nitrates, carbonates, halides or hydroxides of the aforementioned metals, as are exemplified by lead nitrate, cadmium chloride, barium chloride, cadmium nitrate, barium nitrate, lead chloride, zirconium oxychloride, copper chloride or lead chloride. While water will suffice as the solvent, advantageously used are also the water-organic solvent mixtures. The organic solvents conveniently used in this case are those which are miscible with water and moreover have the property of swelling the phenolic filaments, usable being such as dimethylformamide, dimethylacetamide, dioxane or dimethyl sulfoxide.

The salts or hydroxides of the aforesaid metals can be present in the solution at an ionic concentration of 0.05N – 5N, and preferably 0.1N – 3N.

The treatment with a solution containing the hereinbefore-described metallic ions having a great radiation shielding capacity can be adequately carried out by just contacting the foregoing solution with the phenolic filaments that have been sulfonated as described hereinbefore. For instance, this contacting operation can be carried out by such procedures as immersing the sulfonated phenolic filaments in a bath containing the foregoing solution or by running the filaments through such a bath, or by a method of passing the solution through a column packed with the phenolic filaments, or by spraying the phenolic filaments with the foregoing solution. As the treatment temperature, room temperature will be sufficient, and while there is no necessity of heating the atmosphere, it is also permissible, if necessary, to heat the atmosphere to a temperature on the order of 40° – 70°C.

Thus are obtained radiation shielding phenolic fibers in which have been incorporated the metallic ions having a great radiation shielding capacity in an amount of 0.1 – 3.5 meq/g-fiber, and preferably 0.5 – 3 meq/g-fiber.

FINAL PHENOLIC FIBER PRODUCT

The phenolic fibers of the present invention produced as hereinbefore described and having dispersed therein chemically bound metallic ions having a great capacity for shielding radiation possess excellent shielding effects against all types of radiation. Moreover, these fibers excel also in such properties as heat resistance, yarn properties, especially bending property, flame resistance and antifusing property. In addition, the invention fibers are featured in that the degradation of these properties is small even when the fibers are exposed to radiation. For instance, the invention phenolic fibers demonstrate shielding effects against a very broad range of beta rays such as $^{28}$Mg, $^{33}$P, $^{35}$S, $^{36}$Cl, $^{45}$Ca, $^{47}$Ca, $^{46}$Sc, $^{47}$Sc, $^{48}$Sc, $^{52}$Mn, $^{59}$Fe, $^{58}$Co, $^{60}$Co, $^{57}$Ni, $^{63}$Ni, $^{67}$Cu, $^{69}$Zn, $^{59}$Zn, $^{72}$Zn, $^{79}$Sc, $^{88}$Kr, $^{90}$Sr, $^{93}$Zr, $^{103}$Ru, $^{109}$Pd, $^{115}$In, $^{121}$Sn, $^{203}$Hg, and $^{225}$Ra not to mention the low energy beta rays of below 1 Mev such, for example, as $^{3}$H and $^{14}$C. Further, they also exhibit satisfactory shielding effects against the low energy alpha rays.

UTILITY

The radiation shielding phenolic fibers of the present invention can be directly used in the form of monofilaments, multifilaments, or tows, but can also be used in the form of fibers cut to the desired lengths. Or they can be used as spun yarns either alone or in admixture with known filaments or fibers, or in the form of twisted yarns. They can also be made into various filamentary structures such as knit or woven fabrics non-woven fabrics, felt or mat either alone or in admixture with known filaments.

Hence, the phenolic fibers of the present invention can be used for various purposes in the form of such as garments, filters, protective tapes, interior lining materials, radiation shielding shutters, etc.

The following Examples illustrate the present invention in greater detail. In these Examples, all parts and percentages are by weight.

EXAMPLE 1

Phenol (1410 parts), 1180 g of a 37% aqueous solution of formaldehyde and 20 parts of oxalic acid were heated at 95°C. with stirring, and maintained at this temperature for 3 hours. The reaction was stopped by adding a large quantity of cold water.

The resulting phenol resin was dissolved in methanol, and heated at reduced pressure to evaporate off the unreacted phenol, formaldehyde, methanol and water to form a thermofusible novolak resin having a number average molecular weight of 820.

500 parts of the resulting novolak resin was coarsely pulverized, sufficiently dried, and then placed in a 1-liter stainless steel melting device adapted to be heated externally. The inside of the device was purged with a nitrogen gas, and then the novolak resin was melted at 160°C. The molten novolak resin was extruded from the bottom of the melting device at a rate of 3 g/min. through a nozzle having 18 holes each with a diameter of 2.5 mm and heated at 160°C. The filaments obtained were wound up on bobbins at a spinning speed of 1050 m/min. by means of a winder provided 1.5 m immediately below the nozzle. The filaments were cut on the bobbins, and separated from the bobbins in the form of a tow.

The resulting uncured novolak fibers were immersed at room temperature in a mixed aqueous solution containing 18% by weight of formaldehyde and 18% by weight with the fibers-to-solution ratio being maintained at 1:100. The solution was gradually heated to 95°C. in the course of 2 hours, and maintained at 95°C. for 6 hours, thereby to obtain cured phenol fibers having a degree of curing of 11.5%. The fibers were washed with water, dried, and spun and woven in customary manners to form a woven fabric. The woven fabric obtained was pale yellow in color, and had a weight of 30 mg/cm².

The fabric was immersed in 25% fuming sulfuric acid with the fabric-to-sulfuric acid ratio being maintained at 1:50, and allowed to react at 50°C. for 3 hours with stirring. The woven fabric was withdrawn, washed with water, and immersed in 2N $Na_2SO_4$ with the fabric-to-liquid ratio being maintained at 1:100. After standing overnight, the fabric was withdrawn, and washed with water. The fabric was found to have a sulfonic acid group content of 2.0 meq/g.

The fabric was then immersed in a 10% aqueous solution of lead nitrate at 40°C. for 5 hours to combine a lead ion. The amount of the lead combined was 0.8 mmol/g. The fabric was dark brown in color and had a weight of 50 mg/cm².

A β-ray source of $^{90}Sr$ was placed at the bottom of a cylinder with an inside diameter of 4 cm. A laminate of two sheets of the above fabric containing lead was placed at a positon 10 cm apart from the β-ray source. The radioactive ray that passed through the fabric was measured by a Geiger counter, and the transmittance of radioactive rays was determined. Furthermore, the transmittance of a laminate of four fabrics and that of a laminate of six fabrics were also determined. The results are shown in Table 1.

Table 1

| | | Laminate of two | Laminate of four | Laminate of six |
|---|---|---|---|---|
| Present invention | Weight (mg/cm²) | 100 | 200 | 300 |
| | Transmittance (%) | 29.1 | 14.3 | 6.2 |

Table 1-continued

| | | Laminate of two | Laminate of four | Laminate of six |
|---|---|---|---|---|
| Control (untreated fabrics) | Weight (mg/cm²) | 60 | 120 | 180 |
| | Transmittance (%) | 66.3 | 50.2 | 41.1 |

EXAMPLE 2

The novolak filaments prepared in Example 1 were cured with an aqueous mixed solution of hydrochloric acid and formaldehyde only at their peripheral parts. The cured novolak filaments were immersed in a treating liquor prepared by adding 5 parts of urea to 100 parts of a mixed liquid of methanol hydrochloric acid (35.5%)/formaldehyde (37% aqueous solution) in a volume ratio of 3:1:1 with the filaments-to-liquor ratio being maintained at 1:100. The treating liquor was heated from 40°C. to 65°C. over the course of 30 minutes, and then the filaments were allowed to react at 65°C. for 4 hours. The filaments were withdrawn, washed with water and dried to form phenol fibers containing 4% of combined urea and having a degree of curing of 19%.

The phenol filaments obtained were immersed in a concentrated sulfuric acid solution containing 20% of dimethyl acetamide at room temperature with the fibers-to-solution ratio being maintained at 1:50, and then allowed to react at 80°C. for a predetermined period of time. The filaments were then withdrawn, thoroughly washed with water, and converted to an Na type using 1N sodium hydroxide. The sulfonic acid group content of the filaments was measured.

Ten parts of the above fibers containing a sulfonic acid group were treated with 1000 parts of an aqueous solution containing 1000 ppm of lead nitrate in a packed column at a flow rate of 0.1 BV/min. thereby to convert the sulfonic acid group to a lead sulfonate group. The amount of lead combined was determined by quantitative determination of $Pb^{++}$ in the treating water.

The filaments were further washed thoroughly with water, and dried at reduced pressure at 80°C. Then, the tenacity of the filaments was measured. The filaments were cut to a length of 2 inches, and by a customary method, a non-woven fabric having a unit weight of 100 g/m² was prepared by means of a non-woven fabric.

The non-woven fabric obtained was hot pressed at 150°C. at a pressure of 40 Kg/cm² to form a sheet having a thickness of 0.6 mm. Six of such sheets were laminated and a β-ray of $^{90}Sr$ was permitted to pass through this laminate, and the transmittance of radioactive rays was determined. The results obtained are shown in Table 2.

Table 2

| Sample | Reaction Time (hours) | Content of a sulfonic acid group introduced (meq/g) | Amount of lead combined (m-mol/g) | Quality of yarn | | Transmittance (%) |
|---|---|---|---|---|---|---|
| | | | | Tenacity (g/d) | Elongation (%) | |
| Control | 0.2 | 0.04 | 0.02 | 1.8 | 59 | 59.1 |
| Invention | 0.5 | 0.12 | 0.05 | 1.8 | 55 | 41.1 |
| Invention | 1 | 0.55 | 0.25 | 1.6 | 52 | 34.2 |
| Invention | 1.5 | 1.11 | 0.55 | 1.4 | 47 | 27.3 |
| Invention | 2 | 1.78 | 0.82 | 1.2 | 45 | 21.0 |
| Invention | 5 | 2.79 | 1.27 | 0.95 | 30 | 15.3 |
| Invention | 10 | 3.80 | 1.55 | 0.60 | 21 | 11.2 |

Table 2-continued

| Sample | Reaction Time (hours) | Content of a sulfonic acid group introduced (meq/g) | Amount of lead combined (m-mol/g) | Quality of yarn Tenacity (g/d) | Quality of yarn Elongation (%) | Transmittance (%) |
| --- | --- | --- | --- | --- | --- | --- |
| Control | 15 | 4.10 | 1.77 | 0.41 | 14 | 85 |

It is seen from the results shown in Table 2 that the content of a sulfonic acid group introduced is desirably not less than 0.1 meq/g, and if it exceeds 4 meq/g, the shielding efficiency is satisfactory but the quality of the filaments is deteriorated considerably.

EXAMPLE 3

The novolak filaments prepared in Example 1 were immersed in an aqueous mixed solution containing 15% by weight of hydrochloric acid and 16% by weight of formalin at 30°C. with the filaments-to-solution ratio being maintained at 1:50. The solution was heated gradually to 90°C., and the filaments were withdrawn, and washed with cold water.

The treated novolak filaments which were cured only at their outer surface layer were immersed in a mixed solution consisting of 90 parts of a 28% aqueous solution of ammonia and a 37% aqueous solution of formaldehyde with the filaments-to-solution ratio being maintained at 1:100. The solution was heated to 95°C. in the course of 30 minutes, and then the filaments were cured at 95°C. for 2 hours to form cured phenol filaments having a degree of curing of 10.5%.

The cured filaments were immersed in a 70% aqueous solution of N-methyltaurin with the filaments-to-solution ratio being maintained at 1:50, and allowed to react at 110°C. for 3 hours to introduce a sulfonic acid group. The filaments were then immersed in a 1/10 NaOH aqueous solution for 10 hours with stirring to convert the sulfonic acid group to a sodium sulfonate group. The content of the sufonic acid group was also measured, and found to be 1.1 meq/g.

The filaments were then immersed in an aqueous solution containing cadmium chloride in a concentration of 1000 ppm at 25°C. for 15 hours to introduce a cadmium ion into the phenol filaments. The treated filaments were pale yellow in color.

A non-woven cloth having a unit weight of 100 g/m² was prepared in the same way as in Example 2 using a random webber. The transmittance of radioactive rays through this non-woven cloth was determined in the same way as in Example 1 except that a β-ray consisting of $^{14}C$ was used. The rate of shielding was at least 95%.

On the other hand, with a non-woven cloth prepared in the same way from the untreated filaments, the rate of shielding was 55%.

EXAMPLE 4

A cotton-like fibrous material having a fiber length of not more than 2 microns prepared by blowing a molten novolak resin produced in Example 1 using an air jet was immersed in a mixed aqueous solution containing 18% of hydrochloric acid and 13% of formaldehyde at room temperature for 12 hours. The solution was heated to 95°C. in the course of 6 hours, and the filaments were cured for another 6 hours to form filaments having a degree of curing of 16.5%.

The filaments so treated was dispersed in an aqueous solution containing 2% of resole, and then formed into a paperlike sheet in accordance with a conventional sheet-making process.

Using this paper-like sheet, the following three samples were prepared.

A. The paper-like sheet was treated with fuming sulfuric acid at 40°C. for 10 hours, washed with water, and then immersed in 1N NaCl with the sheet-to-liquid ratio being maintained at 1:300 to introduce a sodium sulfonate group into the phenol filaments (content of a sulfonic acid group 2.3 meq/g). Then, the sheet was immersed in a 10% aqueous solution of lead nitrate at room temperature for 10 hours, then washed thoroughly with water to combine a lead ion. The amount of lead combined was 18.6 g/100 g.

B. The paper-like sheet was immersed for 5 hours in a 15% aqueous solution of lead nitrate, and then lightly squeezed by a mangle to adhere lead. The amount of lead adhered, as calculated from the pick-up, was 19 g/100 g.

C. A lead powder which had passed through a 100-mesh sieve was dispersed in an amount of 30% in a phenolic adhesive. The resulting lead-containing adhesive was uniformly coated on the paper-like sheet so that the lead content was 20%, and then heat-treated at 80°C. for 5 hours thereby to cure the adhesive and at the same time fix the lead.

The shielding effect of each of these samples was determined in accordance with the method shown in Example 1 using a β-ray of $^{90}Sr$.

Then, the samples were each treated with warm water at 80°C. for 2 hours, and the shielding effect was measured in the same way. The results are shown in Table 3.

Table 3

| Sample | Amount of lead (g/100 g of sample) | Before washing Density (mg/cm³) | Before washing Transmittance (%) | After washing Density (mg/cm³) | After washing Transmittance (%) |
| --- | --- | --- | --- | --- | --- |
| A | 18.6 | 71 | 31.5 | 71 | 31.2 |
| B | 19.0 | 68 | 45.2 | 42 | 71.9 |
| C | 20.0 | 77 | 47.5 | 72 | 51.3 |
| Blank (untreated) | 0.0 | 42 | 73.1 | 42 | 72.8 |

It will be seen from the results shown in Table 3 that the phenolic filaments in accordance with this invention have a high β-ray shielding effect and good resistance to washing as compared with those prepared by the conventional techniques.

When the above paper-like sheets are used actually as an interior decorating material for example, the bending resistance thereof is an important factor during the manufacturing process and during end use. The sample A has very good resistance to bending as compared with the control sample C. When durability was tested by repeatedly bending the above samples at a bending angle of 60°, it was found that sample C broke after 10 bendings, whereas no change was observed in sample A even when it was bent 1000 times.

EXAMPLE 5

The novolak resin obtained in Example 1 was molded in a spherical form having a diameter of 5 mm. 20 parts of 12 nylon (having a relative viscosity, as measured on a 0.5% m-cresol solution at 30°C., of 1.80) in the form of chips and 80 parts of the above novolak resin were fully mixed in a rotary dryer, and then fed into a melt-spinning apparatus held at 200°C. and having a nozzle diameter of 20 mm, followed by spinning at a spinning speed of 800 m/min. to form filaments (50 d/18f). The spinnability of the mixture was better than that of the novolak resin alone.

The resulting filaments are cut to a length of 2 inches, and immersed at room temperature in a mixed aqueous solution consisting of 18% of hydrochloric acid and 9% of formaldehyde. The solution was heated to 90°C. for 3 hours, and then the filaments were cured in this solution by continuting the reaction for 5 hours. The cured filaments had a degree of curing of 12.8%.

A woven fabric having a weight of 40 mg/cm² was prepared in the same way as in Example 1. The woven fabric was allowed to react for 2 hours in 25% fuming sulfuric acid at 40°C. The treated fabric contained 1.2 meq/g of a sulfonic acid. The fabric was then immersed in ½ NaOH to convert it to a sodium sulfonate type. The fabric was subsequently immersed in a 5% aqueous solution of lead nitrate at room temperature to combine a lead ion. The amount of lead combined was 0.5 m-mol/g, and the weight of the fabric was 49 mg/cm².

Three sheets of the fabric were superimposed, and the transmittance of β-ray was measured in the same way as in Example 1 and was found to be 28%.

What is claimed is:

1. A radiation shielding phenolic fiber comprising (A) a filamentary phenolic polymer consisting predominantly of a sulfonic acid group-containing cured novolak resin wherein said novolak resin contains 0.1–4.0 meq/g-fiber of the sulfonic acid group and is cured to a curing degree of 5–30% and (B) 0.1-3.5 meq/g-fiber of a metallic atom having a great radiation shielding capacity, said metallic atom having an atomic number of at least 13 and being incorporated in said polymer by being chemically bound in the ionic state in said novolak resin.

2. A phenolic fiber of claim 1 wherein said metallic atom having a great radiation shielding capacity is a member selected from the group consisting of cadmium, lead and barium.

3. A phenolic fiber of claim 1 wherein said filamentary phenolic polymer is composed of 100 to 70 percent by weight of a cured novolak resin and 0 to 30 percent by weight of a fiberforming thermoplastic synthetic resin.

4. A phenolic fiber of claim 3 wherein said fiberforming thermoplastic synthetic resin is selected from the group consisting of the polyamide resins, polyester resins, polyesterether resins, polyolefin resins and polyurethane resins.

5. A filamentary structure in a form selected from the group consisting of fibers, yarns, knit fabrics, woven fabrics, nonwoven fabrics, felt, mat and the like, said structure being composed of a filamentary material derived from a radiation shielding phenolic fiber comprising (A) a filamentary phenolic polymer consisting predominantly of a sulfonic acid group-containing cured novolak resin wherein said novolak resin contains 0.1-4.0 meq/g-fiber of the sulfonic acid group and is cured to a curing degree of 5–30% and (B) 0.1–3.5 meq/g-fiber of a metallic atom having a great readiation shielding capacity, said metallic atom having an atomic number of at least 13 and being incorporated in said polymer by being chemically bound in the ionic state in said novolak resin.

6. The radiation shielding phenolic fiber of claim 3 which contains at least 0.1 percent by weight of said fiber forming thermoplastic synthetic resin.

7. The radiation shielding phenolic fiber of claim 6 wherein said fiber forming thermoplastic synthetic resin is a polyamide resin.

8. The radiation shielding phenolic fiber of claim 7 wherein said polyamide resin is selected from at least one member of the group consisting of nylon 6, nylon 11, nylon 12, nylon 66, nylon 610, nylon 611 and nylon 612.

9. The radiation shielding phenolic fiber of claim 4 wherein said fiber forming thermoplastic synthetic resin is present in an amount of from 2 to 25 percent by weight, based on the total weight of the blend.

10. The filamentary structure of claim 5 wherein said component (A) is a blend of said novolac resin and from 0.1 to 30% by weight, based on the total weight of said blend, of a fiber forming thermoplastic synthetic resin selected from the group consisting of polyamide resins, polyester resins, polyesterether resins, polyolefin resins and polyurethane resins.

11. The filamentary structure of claim 5 wherein said radiation shielding metallic atom is cadmium, barium or lead.

* * * * *